United States Patent
Bae et al.

(10) Patent No.: US 9,018,275 B2
(45) Date of Patent: Apr. 28, 2015

(54) PHOTO-CURABLE TRANSPARENT RESIN COMPOSITION

(75) Inventors: Byeong-Soo Bae, Daejeon (KR); SeungCheol Yang, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 177 days.

(21) Appl. No.: 13/403,298

(22) Filed: Feb. 23, 2012

(65) Prior Publication Data

US 2012/0220681 A1      Aug. 30, 2012

(30) Foreign Application Priority Data

Feb. 28, 2011   (KR) .................. 10-2011-0018179

(51) Int. Cl.

| | |
|---|---|
| *C08G 59/68* | (2006.01) |
| *C08F 2/46* | (2006.01) |
| *B29C 71/04* | (2006.01) |
| *A61L 2/08* | (2006.01) |
| *A61L 24/00* | (2006.01) |
| *C08G 61/04* | (2006.01) |
| *C08G 59/32* | (2006.01) |
| *C08L 83/06* | (2006.01) |
| *C08G 65/10* | (2006.01) |
| *C08G 65/18* | (2006.01) |

(52) U.S. Cl.
CPC ............ *C08G 59/3281* (2013.01); *C08L 83/06* (2013.01); *C08G 59/68* (2013.01); *C08G 65/105* (2013.01); *C08G 65/18* (2013.01)

(58) Field of Classification Search
USPC .................. 522/31, 6, 1, 71, 189, 184; 520/1
See application file for complete search history.

(56) References Cited

U.S. PATENT DOCUMENTS

| | | | | |
|---|---|---|---|---|
| 6,008,265 A | * | 12/1999 | Vallee et al. .................... 522/25 |
| 2005/0170187 A1 | * | 8/2005 | Ghoshal ........................ 428/413 |
| 2008/0293875 A1 | * | 11/2008 | Hatanaka ....................... 524/588 |

FOREIGN PATENT DOCUMENTS

| | | | |
|---|---|---|---|
| JP | 2006-082322 | * | 3/2006 |
| JP | 2007-177073 | * | 7/2007 |
| JP | 2008179811 | | 8/2008 |
| JP | 2009-270027 | * | 11/2009 |
| JP | 2009270027 | | 11/2009 |

OTHER PUBLICATIONS

Okubo et al, JP 2006-082322 Machine translation.*
Daito, JP 2007-177073 Machine Translation, Jul. 12, 2007.*
C. Decker, "Photoinitiated Crosslinking Polymerisation," Prog. Polym. Sci., 1996, pp. 593-650, vol. 21, Elsevier Science Ltd., Great Britain.

* cited by examiner

*Primary Examiner* — Ling Choi
*Assistant Examiner* — Jessica E Whiteley
(74) *Attorney, Agent, or Firm* — Cantor Colburn LLP

(57) ABSTRACT

Provided is a photo-curable transparent resin in which an oxetane monomer for promotion of photo-curing, control of viscosity, and improvement of physical properties is mixed with a photo-cationically polymerizable cyclo-aliphatic epoxy group-containing oligosiloxane resin prepared by a sol-gel reaction. The photo-cationically polymerizable photo-curable transparent resin added with the oxetane monomer provides a cured product having high curing density and retaining excellent mechanical properties, thermal-mechanical properties, and electrical properties.

5 Claims, No Drawings

PHOTO-CURABLE TRANSPARENT RESIN COMPOSITION

CROSS-REFERENCE TO RELATED APPLICATIONS

This application claims priority under 35 U.S.C. §119 to Korean Patent Application No. 10-2011-0018179, filed on Feb. 28, 2011, in the Korean Intellectual Property Office, the disclosure of which is incorporated herein by reference in its entirety.

TECHNICAL FIELD

The following disclosure relates to a photo-curable transparent resin composition in which an oxetane monomer for promotion of photo-curing, control of viscosity, and improvement of physical properties is mixed with a photo-cationically polymerizable cyclo-aliphatic epoxy group-containing oligosiloxane resin Prepared by a sol-gel reaction. The photo-cationically polymerizable photo-curable transparent resin composition added with the oxetane monomer provides a cured product having fast photo-curable property and retaining excellent mechanical properties, thermal-mechanical properties, and electrical properties.

BACKGROUND OF THE INVENTION

Photo-cationic polymerization of cyclo-aliphatic epoxy group has many advantages as compared with photo-radical polymerization of acryl group. Since the photo-cationic polymerization of cyclo-aliphatic epoxy group is not sensitive to oxygen and has living characteristics, it can produce a cured product having a higher curing degree, as compared with the photo-radical polymerization of acryl group, which is sensitive to oxygen and has no living characteristics. In addition, the inert gas atmosphere does not need to be maintained during curing, resulting in a more simple process. The cyclo-aliphatic epoxy cured product by the photo-cationic polymerization, that is capable of realizing a high curing degree, has many advantages, such as, low shrinkage, excellent mechanical and electrical properties, excellent chemical resistance, excellent adhesion with various substrates, and the like, as compared with an acryl cured product by the photo-radical polymerization. However, the photo-cationic polymerization of cyclo-aliphatic epoxy resin is less frequently employed in industries because of a lower photo-curing speed than the photo-radical polymerization and limited kinds of precursors. (Prog. Polym. Sci., 21, 593-650 (1996))

A photo-cationically polymerizable cyclo-aliphatic epoxy group-containing oligosiloxane resin synthesized by a sol-gel reaction has an advantage in that it is faster in photo-cationic polymerization than a photo-cationically polymerizable cyclo-aliphatic epoxy group-containing monomer/polymer, due to the presence of siloxane networks therein. In addition, due to the siloxane networks, a cured product of the cyclo-aliphatic epoxy oligosiloxane resin has low shrinkage, high thermal stability, excellent chemical resistance, and the like, as compared with a cured product of the cyclo-aliphatic epoxy group-containing polymer. However, the rate of photo-cationic, polymerization of the photo-cationically polymerizable cyclo-aliphatic epoxy oligosiloxane resin is still insufficient as compared with that of photo-radical polymerization of acryl monomer/polymer.

Therefore, the speed of photo-cationic polymerization needs to be improved in order to extend the application of the photo-cationically polymerizable cyclo-aliphatic epoxy oligosiloxane resin. Meanwhile, the cured product of the cyclo-aliphatic epoxy oligosiloxane resin, of which the rate of photo-cationic polymerization is increased, may have higher cross-linking density, and thus, it is anticipated that it has excellent mechanical properties, thermal-mechanical properties, and electrical properties, as compared with cured products of the existing cyclo-aliphatic epoxy oligosiloxane resin.

SUMMARY

An embodiment of the present invention is directed to a photo-curable transparent resin composition capable of promoting photo-curing speed, controlling viscosity, and improving physical properties, by adding an oxetane monomer into a photo-cationically polymerizable cyclo-aliphatic epoxy group-containing oligosiloxane resin, which is prepared by a sol-gel reaction, and a photo-curable transparent resin using the same.

Another embodiment of the present invention is directed to a photo-curable transparent resin composition capable of allowing photo-cationic polymerizability, high cross-linking density, excellent mechanical properties, excellent thermal-mechanical properties, and excellent electrical properties, and a photo-curable transparent resin using the same.

In one general, the present invention provides a photo-curable transparent resin in which an oxetane monomer for a fast photo-curing speed, control of viscosity, and high curing density is added to a photo-cationically polymerizable cyclo-aliphatic epoxy-containing oligosiloxane resin, which is prepared by a sol-gel reaction of photo-cationically polymerizable cyclo-aliphatic epoxy-containing alkoxysilane alone or between photo-cationically polymerizable cyclo-aliphatic epoxy-containing alkoxysilane and alkoxysilane or silanol.

The photo-cationically polymerizable cyclo-aliphatic epoxy-containing oligosiloxane resin according to the present invention is prepared by a sol-gel reaction of photo-cationically polymerizable cyclo-aliphatic epoxy-containing alkoxysilane alone or between photo-cationically polymerizable cyclo-aliphatic epoxy-containing alkoxysilane and alkoxysilane or silanol.

As such, the oxetane monomer is added to the photo-cationically polymerizable cyclo-aliphatic epoxy-containing oligosiloxane resin synthesized by a sol-gel reaction, thereby controlling viscosity of the oligosiloxane resin, increasing a photo-curing speed, and yielding a cured product having high cross-linking density.

A cured product of the photo-curable transparent resin of the present invention in which an oxetane monomer is added to the photo-cationically polymerizable cyclo-aliphatic epoxy-containing oligosiloxane resin can have excellent mechanical properties, thermal-mechanical properties, and electrical properties.

Hereinafter, the present invention will be described in more detail.

Photo-cationically polymerizable cyclo-aliphatic epoxy group-containing oligosiloxane is prepared by a sol-gel reaction. Reaction Scheme 1 below shows a hydrolysis-condensation reaction of alkoxysilane in the presence of water, which is a general hydrolytic sol-gel reaction for preparing photo-cationically polymerizable cyclo-aliphatic epoxy group-containing oligosiloxane.

[Reaction Scheme 1]

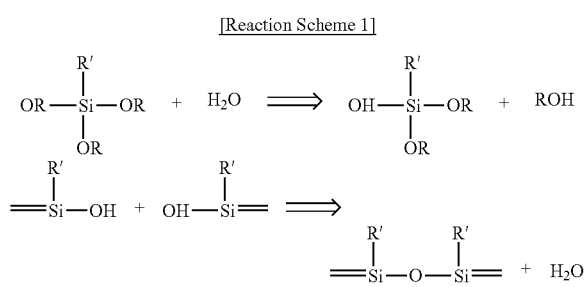

As seen from Reaction Scheme 1 above, an alkoxy group of alkoxysilane as a starting material is hydrolyzed with water to form a hydroxy group, and then this is linked to an alkoxy group or a hydroxy group of another monomer by a siloxane bond through a condensation reaction, thereby forming oligosiloxane.

Reaction Scheme 2 below shows a condensation reaction between hydroxy group-containing silanol and alkoxy group-containing alkoxysilane, without addition of water, which is a non-hydrolyzable sol-gel reaction.

[Reaction Scheme 2]

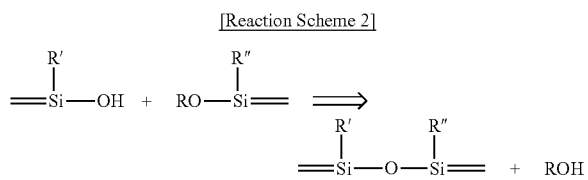

As seen from Reaction Scheme 2 above, a hydroxy group of the silanol and an alkoxy group of the alkoxysilane, which are starting materials, are linked by a siloxane bond through the condensation reaction, thereby forming oligosiloxane.

In order to prepare the photo-cationically polymerizable cyclo-aliphatic epoxy group-containing oligosiloxane resin by using the general hydrolytic sol-gel reaction, the siloxane bond is formed through the hydrolysis-condensation reaction, according to which water is added to the photo-cationically polymerizable cyclo-aliphatic epoxy group-containing alkoxysilane alone or a mixture thereof with another alkoxysilane, and thus, a catalyst may be preferably fed thereinto to promote the sol-gel reaction. As a usable catalyst, an acidic catalyst such as acetic acid, phosphoric acid, sulfuric acid, hydrochloric acid, nitric acid, chlorosulfonic acid, para-toluic acid, trichloroacetic acid, polyphosphoric acid, phyllophosphoric acid, iodic acid, tartaric acid, perchloric acid, or the like, a basic catalyst such as ammonia, sodium hydroxide, n-butyl amine, di-n-butyl amine, tri-n-butyl amine, imidazole, ammonium perchlorate, potassium hydroxide, barium hydroxide, or the like, or an ion exchange resin such as Amberite IPA-400 (Cl) or the like may be used. The feeding amount of catalyst is not particularly limited, but 0.0001 to 10 parts by weight thereof based on 100 parts by weight of alkoxysilane may be added.

The reaction may be preferably stirred at a room temperature for 6 to 144 hours. Here, the hydrolysis-condensation reaction is induced at 0 to 100° C. or preferably at 60 to 80° C., for 12 to 36 hours, in order to promote the reaction rate and perform the complete condensation reaction, thereby preparing the photo-cationically polymerizable cyclo-aliphatic epoxy group-containing oligosiloxane resin.

Meanwhile, alcohol as a byproduct and water remaining after the reaction are present within the photo-cationically polymerizable cyclo-aliphatic epoxy group-containing oligosiloxane resin prepared through the hydrolysis-condensation reaction. These may be removed by performing the reaction at 0 to 120° C. under atmospheric pressure or reduced pressure, and preferably under the conditions of 50 to 70° C. and −0.1 MPa, for 10 to 60 minutes.

In order to prepare the photo-cationically polymerizable epoxy oligosiloxane resin by using the general non-hydrolytic sol-gel reaction, photo-cationically polymerizable cyclo-aliphatic epoxy group-containing oligosiloxane is formed through the condensation reaction between an alkoxy group of the photo-cationically polymerizable cyclo-aliphatic epoxy group containing alkoxysilane and a hydroxy group of silanol, and thus, preferably, a catalyst may be fed thereinto to lower the reaction temperature and promote the sol-gel reaction. As a usable catalyst, metal hydroxide such as barium hydroxide, strontium hydroxide, or the like, may be used. The feeding amount of catalyst is not particularly limited, but 0.0001 to 10 parts by weight thereof based on the overall silane may be added. In the above reaction, stirring may be performed at a room temperature for 2 to 72 hours. Here, the hydrolysis-condensation reaction is induced at 0 to 100° C. or preferably at 60 to 80° C., for 2 to 6 hours, in order to promote the reaction rate and completely perform the condensation reaction, thereby forming a siloxane bond.

The present invention may include an oxetane monomer as well as the photo-cationically polymerizable cyclo-aliphatic epoxy group-containing oligosiloxane resin, in order to control viscosity of the prepared photo-cationically polymerizable cyclo-aliphatic epoxy Group-containing oligosiloxane resin, increase the photo-curing speed, and obtain a cured product having high cross-linking density.

The added amount of oxetane monomer added to the photo-cationically polymerizable cyclo-aliphatic epoxy group-containing oligosiloxane resin is not limited. However, the oxetane monomer is preferably added in an equivalent ratio of 0.5 to 2.0 based on the resin to obtain the cured product having high cross-linking density.

As the photo-cationically polymerizable cyclo-aliphatic epoxy group-containing alkoxysilane, at least one selected from materials of Chemical Formula 1 below may be used.

$$R^1{}_n Si(OR^2)_{4-n}$$ [Chemical Formula 1]

(In Chemical Formula 1, $R^1$ represents an cyclo-aliphatic epoxy group; $R^2$ represents linear or branched (C1~C7)alkyl; and n represents an integer of 1 to 3.)

More specifically, as the photo-cationically polymerizable cyclo-aliphatic epoxy group-containing alkoxysilane, at least one selected from the group consisting of 2-(3,4-epoxycyclohexyl)ethyltrimethoxysilane, 2-(3,4-epoxycyclohexyl)ethyltriethoxysilane may be used, but not limited thereto.

As the alkoxysilane or silanol, at least one selected from materials of Chemical Formula 2 below may be used.

$$R^3{}_n Si(OR^4)_{4-n}$$ [Chemical Formula 2]

(In Chemical Formula 2, $R^3$ includes at least one functional group selected from the group consisting of (C1~C20)alkyl, (C3~C8)cycloalkyl, (C1~C20)alkyl substituted with (C3~C8)cycloalkyl, (C2~C20)alkenyl, (C2~C20)alkynyl and (C6~C20)aryl, or the group consisting of an acryl group, a methacryl group, an allyl group, a halogen group, an amino group, a mercapto group, an ether group, an ester group, a (C1~C20)alkoxy group, a sulfone group, a nitro group, a hydroxy group, a cyclobutene group, a carbonyl group, a carboxylic group, an alkyd group, a urethane group, a vinyl group, a nitrile group, an epoxy group, an oxetane group, and a phenyl group, $R^4$ represents linear or branched (C1~C7) alkyl or hydrogen, and n represents an integer of 0 to 3.)

More specifically, at least one selected from the group consisting of triphenylsilanol, phenyltrisilanol, diphenylsilanediol, diisobutylsilanediol, triphenylmethoxysilane, triphenylethoxysilane, phenyltrimethoxysilane, phenyltriethoxysilane, diphenyldimethoxysilane, diphenyldiethoxysilane, diisobutyldimethoxysilane, diisobutyldiethoxysilane, tetramethoxysilane, tetraethoxysilane, methyltrimethoxysilane, methyltriethoxysilane, methyltripropoxysilane, propylethyltrimethoxysilane, ethyltriethoxysilane, vinyltrimethoxysilane, vinyltriethoxysilane, vinyltripropoxysilane, phenyltrimethoxysilane, N-(3-acryloxy-2-hydroxypropyl)-3-aminopropyltriethoxysilane, N-(3-acryloxy-2-hydroxypropyl)-3-aminopropyltrimethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(aminoethyl-3-aminopropyl)trimethoxysilane, N-(2-aminoethyl-3-aminopropyl)triethoxysilane, 3-aminoporpyltrimethoxysilane, 3-aminopropyltriethoxysilane, chloropropyltrimethoxysilane, chloropropyltriethoxysilane, and heptadecafluordecyltrimethoxysilane may be used as the alkoxysilane or silanol, but is not necessarily limited thereto.

The oxetane monomer may be at least one selected from monomers containing at least one oxetane group, and preferably, the oxetane monomer is characterized to be an oxetane monomer including a structure of Chemical Formula 3 below.

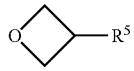

[Chemical Formula 3]

(In Chemical Formula 3, $R^5$ is selected from the group consisting of hydrogen, (C1~C20)alkyl, (C3~C8)cycloalkyl, (C1~C20)alkyl substituted with (C3~C8)cycloalkyl, (C2~C20)alkenyl, (C2~C20)alkynyl and (C6~C20)aryl.)

More specifically, the monomer containing the oxetane group may include at least one selected from the group consisting of 3-ethyl-3-hydroxymethyloxetane, 2-ethylhexyloxetane, xylene bisoxetane, 3-ethyl-3[[3-ethyloxetan-3-yl]methoxy]methyl]oxetane.

In the present invention, a photo-initiator is preferably included for photo-cationic polymerization of the photo-curable transparent resin in which the oxetane monomer and the photo-cationically polymerizable cyclo-aliphatic epoxy group-containing oligosiloxane resin are mixed with each other.

The photo-initiator for photo-cationic polymerization is preferably added in 0.1 to 10 parts by weight based on 100 parts by weight of the photo-cationically polymerizable photo-curable transparent resin added with the oxetane monomer.

As the photo-initiator initiator for photo-cationic polymerization, an onium salt, an organometallic salt, or the like may be used, but not limited thereto. Specifically, a diaryliodonium salt, a triarylsulfonium salt, an aryldiazonium salt, an iron-arene complex, or the like may be used, but not limited thereto.

More specifically, the photo-initiator for photo-cationic polymerization includes at least one selected from the group consisting of arylsulfonium hexafluoroantimonium salt, an arylsulfonium hexafluorophosphate salt, a diphenyliodonium hexafluorophosphate salt, a ditolyliodonium hexafluorophosphate salt, and a 9-(4-hydroxyethoxyphenyl)thianthrenium hexafluorophosphate salt.

Also, in a case where the Photocationic polymerization through stages added with The oxetane monomers that can be added Photocationic polymerization cross-linking transparent resin, thermal treatment may be performed thereafter. The thermal treatment can lead to higher cross-linking density of an oligosiloxane resin cured product due to living characteristics of photo-cationic polymerization. The thermal treatment may be performed at 250° C. or lower, and more specifically, at 50 to 250° C. The thermal treatment may be performed at 150° C. or lower, and more specifically, at 50 to 150° C. If the thermal treatment is performed at a high temperature of 250° C. or higher, bonding chains between organic functional groups may be broken. If the thermal treatment is performed at a significantly low temperature, the living characteristics of the photo-cationic polymerization may not be well expressed.

DETAILED DESCRIPTION OF EMBODIMENTS

The present invention will be described with reference to the following examples. However, these examples do not limit the technical scope of the present invention.

EXAMPLE 1

2-(3,4-epoxycyclohexyl)ethyltrimethoxysilane (ECTMS, Gelest Company):diphenylsilanediol (DPSD, Gelest Company) were mixed at a ratio of 12.32 g:10.82 g (0.05 mol:0.05 mol), and then put into a 100 ml 2-neck flask. Thereafter, 0.02 g (0.1 mol % based on silane) of barium hydroxide as a catalyst was added to the mixture, and stirred at 80° C. for 4 hours under nitrogen purge. The resin obtained after a sol-gel reaction for 4 hours was filtered by using 0.45 μm Teflon filter, thereby obtaining an cyclo-aliphatic epoxy oligosiloxane resin. Then, 3-ethyl-3[[3-ethyloxetan-3-yl]methoxy]methyl] oxetane was added in 20 parts by weight based on the resin (at an equivalent ratio of 1:1), and an arylsulfonium hexafluoroantimonium salt as a photo-initiator for photo-cationic polymerization was added in 2 parts by weight based on the resultant resin. Then, the thus obtained resin was stirred for 3 hours, and viscosity thereof was measured. The manufactured sample was exposed to a UV lamp at 365 nm wavelength for 3 minutes, so that the photo-curing degree thereof was checked. After photo-curing was completely finished, thermal curing was performed at a temperature 150° C. for 2 hours, so that electrical properties, thermal-mechanical properties, and mechanical properties thereof were evaluated.

EXAMPLE 2

2-(3,4-epoxycyclohexyl)ethyltrimethoxysilane (ECTMS, Gelest Company):diphenyldimethoxysilane (DPDMS, Aldrich Company) were mixed at a ratio of 12.32 g:10.82 g (0.05 mol:0.05 mol), and then put into a 100 ml 1-neck flask. Thereafter, 2.7 g of water was added to the mixture, and 1 g of Amberite IPA-400(Cl) as a catalyst was added thereto, followed by stirring at 80° C. for 24 hours under reflux. Water and methanol were removed from the resin obtained after the sol-gel reaction for 24 hours by using a reduced pressure evaporator under a pressure of −0.1 MPa and a temperature of 60° C. Thereafter, the resulting resin was filtered by using a 0.45 μm Teflon filter, thereby obtaining an cyclo-aliphatic epoxy oligosiloxane resin. Then, 3-ethyl-3-hydroxymethyloxetane was added in 20 parts by weight based on the resin (at an equivalent ratio of 1:1), and a 9-(4-hydroxyethoxyphenyl)thianthrenium hexafluoroantimonium salt as a photo-initiator for photo-cationic polymerization was added in 2 parts by weight based on the resultant mixed resin. Then, the thus obtained resin was stirred for 3 hours, and viscosity thereof was measured. The manufactured sample was exposed to a UV lamp at 365 nm wavelength for 3 minutes, so that the photo-curing degree thereof was checked. After photo-curing was completely finished, thermal curing was performed at a temperature 150° C. for 2 hours, so that electrical properties, thermal-mechanical properties, and mechanical properties thereof were evaluated.

EXAMPLE 3

24.63 g (0.1 mol) of 2-(3,4-epoxycyclohehexyl)ethyltrimethoxysilane (ECTMS, Gelest Company) was put into a 100 ml 1-neck flask. Thereafter, 2.7 g of water was added to the mixture, and 1 g of Amberite IPA-400(Cl) (Aldrich Company) as a catalyst was added thereto, followed by stirring at 80° C. for 24 hours under reflux. Water and methanol were removed from the resin obtained after the sol-gel reaction for 24 hours by using a reduced pressure evaporator under a pressure of −0.1 MPa and a temperature of 60° C. Thereafter, the resulting resin was filtered by using a 0.45 μm Teflon filter, thereby obtaining an cyclo-aliphatic epoxy oligosiloxane resin. Then, 3-ethyl-3-hydroxymethyloxetane was added in 60 parts by weight based on the resin (at an equivalent ratio of 1:1), and a 9-(4-hydroxyethoxyphenyl) thianthrenium hexafluoroantimonium salt as a photo-initiator for photo-cationic polymerization was added in 2 parts by weight based on the resultant mixed resin. Then, the thus obtained resin was stirred for 3 hours, and viscosity thereof was measured. The manufactured sample was exposed to a UV lamp at 365 nm wavelength for 3 minutes, so that the photo-curing degree thereof was checked. After photo-curing was completely finished, thermal curing was performed at a temperature 150° C. for 2 hours, so that electrical properties, thermal-mechanical properties, and mechanical properties thereof were evaluated.

COMPARATIVE EXAMPLE 1

2-(3,4-epoxycyclohexyl)ethyltrimethoxysilane (ECTMS, Gelest Company):diphenylsilanediol (DPSD, Gelest Company) were mixed at a ratio of 12.32 g:10.82 g (0.05 mol:0.05 mol), and then put into 100 ml of 2-neck flask. Thereafter, 0.02 g (0.1 mol % based on silane) of barium hydroxide as a catalyst was added to the mixture, and stirred at 80° C. for 4 hours under nitrogen purge. The resin obtained after a sol-gel reaction for 4 hours was filtered by using 0.45 μm Teflon filter, thereby obtaining an cyclo-aliphatic epoxy oligosiloxane resin. An arylsulfonium hexafluoroantimonium salt as a photo-initiator for photo-cationic polymerization was added in 2 parts by weight based on the resultant mixed resin, followed by stirring for 3 hours, and then viscosity thereof was measured. The manufactured sample was exposed to a UV lamp at 365 nm wavelength for 3 minutes, so that the photo-curing degree thereof was checked. After photo-curing was completely finished, thermal curing was performed at a temperature 150° C. for 2 hours, so that electrical properties, thermal-mechanical properties, and mechanical properties thereof were evaluated.

COMPARATIVE EXAMPLE 2

2-(3,4-epoxycyclohexyl)ethyltrimethoxysilane (ECTMS, Gelest Company):diphenyldimethoxysilan (DPDMS, Aldrich Company) were mixed at a ratio of 12.32 g:10.82 g (0.05 mol:0.05 mol), and then put into a 100 ml 1-neck flask. Thereafter, 2.7 g of water was added to the mixture, and 1 g of Amberite IPA-400(Cl) as a catalyst was added thereto, followed by stirring at 80° C. for 24 hours under reflux. Water and methanol were removed from the resin obtained after the sol-gel reaction for 24 hours by using a reduced pressure evaporator under a pressure of −0.1 MPa and a temperature of 60° C. Thereafter, the resulting resin was filtered by using a 0.45 μm Teflon filter, thereby obtaining an cyclo-aliphatic epoxy oligosiloxane resin. A 9-(4-hydroxyethoxyphenyl)thianthrenium hexafluoroantimonium salt as a photo-initiator for photo-cationic polymerization was added in 2 parts by weight based on the resultant mixed resin, followed by stirring for 3 hours, and then viscosity thereof was measured. The manufactured sample was exposed to a UV lamp at 365 nm wavelength for 3 minutes, so that the photo-curing degree thereof was checked. After photo-curing was completely finished, thermal curing was performed at a temperature 150° C. for 2 hours, so that electrical properties, thermal-mechanical properties, and mechanical properties thereof were evaluated.

COMPARATIVE EXAMPLE 3

24.63 g (0.1 mol) of 2-(3,4-epoxycyclohehexyl)ethyltrimethoxysilane (ECTMS, Gelest Company) was put into a 100 ml 1-neck flask. Thereafter, 2.7 g of water was added to the mixture, and 1 g of Amberite IPA-400(Cl) (Aldrich Company) as a catalyst was added thereto, followed by stirring at 80° C. for 24 hours under reflux. Water and methanol were removed from the resin obtained after the sol-gel reaction for 24 hours by using a reduced pressure evaporator under a pressure of −0.1 MPa and a temperature of 60° C. Thereafter, the resulting resin was filtered by using a 0.45 μm Teflon filter, thereby obtaining an cyclo-aliphatic epoxy oligosiloxane resin. A 9-(4-hydroxyethoxyphenyl)thianthrenium hexafluoroantimonium salt as a photo-initiator for photo-cationic polymerization was added in 2 parts by weight based on the resultant mixed resin, followed by stirring for 3 hours, and then viscosity thereof was measured. The manufactured sample was exposed to a UV lamp at 365 nm wavelength for 3 minutes, so that the photo-curing degree thereof was checked. After photo-curing was completely finished, thermal curing was performed at a temperature 150° C. for 2 hours, so that electrical properties, thermal-mechanical properties, and mechanical properties thereof were evaluated.

<Test Example>

Each of samples obtained from the above examples and comparative examples was evaluated by the following methods, and the results thereof were tabulated in Table 1.

[Viscosity]

Viscosity at 25° C. was measured by Rheometer RVDV-III+ from Brookfield Company.

[Photo-Curing Degree]

After the resin was exposed to a UV lamp at 365 nm wavelength for 3 minutes, an FT-IR spectrum thereof was obtained by using FT-IR 460PLUS of JASCO Company, and then the conversion degree (photo-curing degree, %) was calculated by using a ratio between a phenyl group and an epoxy group.

[Leakage Current]

Leakage current at 1 MV/cm was measured from an I-V curve obtained by using Keithley237 of Keithley Company.

[Flexural Modulus]

Flexural Modulus was measured by performing a 3-point bending test on the sample prepared according to ASTM D790-92, using a Universal Testing Machine (Model: INSTRON 5583) of Instron Corporation.

[Coefficient of Thermal Expansion]

Coefficient of Thermal Expansion in the temperature range of 100° C. to 150° C. was measured while heating was performed to 225° C. at a temperature rise rate of 5° C./min under nitrogen atmosphere, by using a thermomechanical analyzer, Extar 6000 of Seiko Instrument Company. Here, a load of 100 mN and a frequency of 20 Hz were used.

TABLE 1

| | Example 1 | Example 2 | Example 3 | Comparative Example 1 | Comparative Example 2 | Comparative Example 3 |
|---|---|---|---|---|---|---|
| Viscosity (cP) | 2730 | 3450 | 4280 | 43750 | 52400 | 122300 |
| Photo-curing degree (%) | 87 | 88 | 85 | 66 | 52 | 43 |
| Leakage Current (nA/cm²) | 5 | 2 | 7 | 15 | 13 | 23 |
| Flexural Modulus (MPa) | 1660.3 | 1750.4 | 2139.2 | 1533.6 | 1560.2 | 1952.3 |
| Coefficient of Thermal Expansion (ppm/° C.) | 195.8 | 189.4 | 118.2 | 212.9 | 205.4 | 140.5 |

As shown in Table 1, when Examples 1 to 3 are compared with Comparative Examples 1 to 3, it can be confirmed that viscosity was decreased by one-tenth or less, and photo-curing degree was increased by 20 to 40% due to fast propagation effect of the oxetane monomer retaining high basicity, in the photo-cationically polymerizable cyclo-aliphatic epoxy group-containing oligosiloxane resin added with oxetane monomer. In addition, it can be confirmed that the leakage current of the cured product manufactured by the photo-cationically polymerizable cyclo-aliphatic epoxy group-containing oligosiloxane resin added with oxetane monomer was decreased by half or less, as compared with a case in which the oxetane monomer is absent. In addition, an increase of about 100~200 MPa in Flexural Modulus and decrease of about 15 to 20 ppm/° C. in coefficient of thermal expansion can be confirmed. These results resulted from high cross-linking density effects due to the addition of the oxetane monomer according to the present invention.

As the results of the examples and comparative examples, the photo-curable transparent resin of the present invention, in which the oxetane monomer is added to the photo-cationically polymerizable cyclo-aliphatic epoxy group-containing oligosiloxane resin prepared by the sol-gel reaction, has a fast speed of photo-cationic polymerization and low viscosity, and thus, it can solve the problems in the existing cyclo-aliphatic epoxy oligosiloxane, such as, low photo-curing degree of photo-cationic polymerization and low processability. In addition, since the cured product obtained from the photo-curable transparent resin, in which the oxetane monomer is added to the photo-cationically polymerizable cyclo-aliphatic epoxy group-containing oligosiloxane resin, retains high cross-linking density, and excellent mechanical properties, thermal-mechanical properties, and electrical properties, it can be anticipated that the present invention is applicable in various fields, such as the optical industry and display industry, in which acryl monomer/polymer of photo-radical polymerization was used.

According to the present invention, the oxetane monomer is added to the photo-cationically polymerizable cyclo-aliphatic epoxy group-containing oligosiloxane resin, and thus, viscosity of the resin can be controlled and photo-curing rate thereof can be increased. Therefore, excellent processability of the resin can be achieved due to low viscosity of the photo-curable transparent resin added with the oxetane monomer, and high curing density of the cured product can be obtained due to the fast photo-curing speed. The photo-cationically polymerizable photo-curable transparent resin added with the oxetane, according to the present invention, can exhibit excellent mechanical properties, thermal-mechanical properties, and electrical properties, and thus, it can be broadly applicable in all industries.)

What is claimed is:

1. A photo-curable transparent resin composition, comprising a blend of
   a cyclo-aliphatic epoxy group-containing oligosiloxane resin having a structure of Chemical Formula 1,

   Chemical Formula 1 where $R^1$ is a cyclo-aliphatic epoxy group; $R^2$ is a linear or branched $(C_1-C_7)$alkyl; and n is an integer of 1 to 3, wherein the cyclo-aliphatic epoxy group-containing oligosiloxane resin is a non-hydrolyzed sol-gel reaction product of a cyclo-aliphatic epoxy group-containing alkoxysilane or of the cyclo-aliphatic epoxy group-containing alkoxysilane and an alkoxysilane or a silanol,
   an oxetane compound, wherein the oxetane compound comprises an oxetane group having a structure of Chemical Formula 3,

[Chemical Formula 3]

where, $R^5$ is hydrogen, $(C_1-C_{20})$alkyl, $(C_3-C_8)$cycloalkyl, $(C_1-C_{20})$alkyl substituted with $(C_3-C_8)$cycloalkyl, $(C_2-C_{20})$alkenyl, $(C_2-C_{20})$alkynyl or $(C_6-C_{20})$aryl; and
   a photo-initiator for photo-cationic polymerization, wherein the photoinitiator is at least one of diphenyliodonium hexafluorophosphate salt, ditolyliodonium hexafluorophosphate salt, and 9-(4-hydroxyethoxyphenyl)thianthrenium hexafluorophosphate salt.

2. The photo-curable transparent resin composition of claim 1, wherein the alkoxysilane or silanol is at least one compound having a structure of Chemical Formula 2,

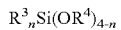   Chemical Formula 2 where $R^3$ is a (C1~C20)alkyl, (C3~C8)cycloalkyl, (C1~C20)alkyl substituted with (C3~C8)cycloalkyl, (C2~C20)alkenyl, (C2~C20)alkynyl, or (C6~C20)aryl, an acryl group, a methacryl group, an allyl group, a halogen group, an amino group, a mercapto group, an ether group, an ester group, a (C1~C20)alkoxy group, a sulfone group, a nitro group, a hydroxy group, a cyclobutene group, a carbonyl group, a carboxylic group, an alkyd group, a urethane group, a vinyl group, a nitrile group, an epoxy group, an oxetane group, or a phenyl group; $R^4$ is a linear or branched (C1~C7)alkyl or hydrogen; and n is an integer of 0 to 3.

3. The photo-curable transparent resin composition of claim 1, wherein the oxetane compound has an equivalent ratio of 0.5 to 2.0 based on the cyclo-aliphatic epoxy group-containing oligosiloxane resin.

4. The photo-curable transparent resin composition of claim 1, wherein the sol-gel reaction is performed in the presence of at least one of an acid catalyst, a base catalyst, an ion exchange resin, or a metal hydroxide catalyst.

5. A photo-curable transparent resin prepared by photo-curing the photo-curable transparent resin composition of claim 1; and performing thermal treatment on the photo-cured resin at a temperature of 50 to 200° C.

\* \* \* \* \*